Oct. 18, 1949.　　　　　R. C. DEHMEL　　　　2,485,435
AIRCRAFT NAVIGATING AND TRAINING APPARATUS
Filed Aug. 14, 1943　　　　　　　　　　　　6 Sheets-Sheet 2
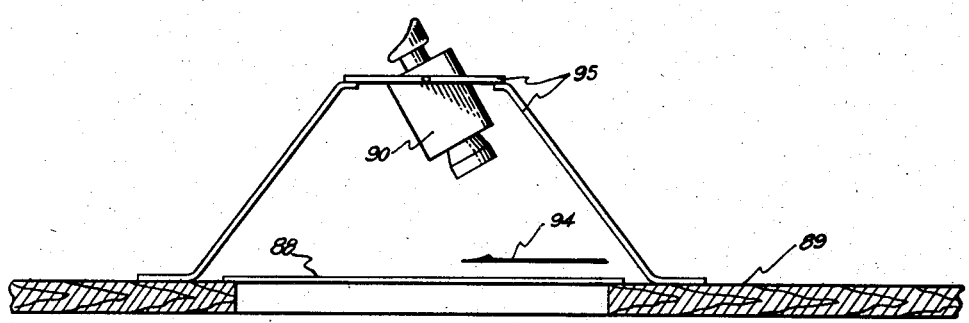
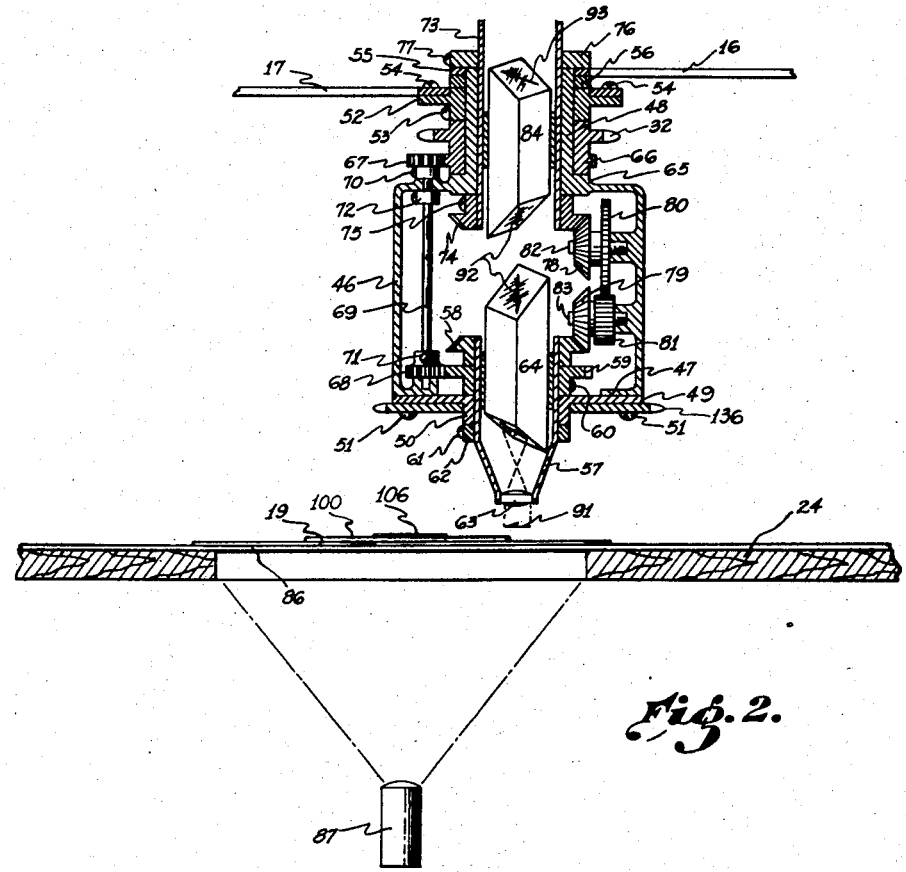
Fig. 2.
INVENTOR
Richard C. Dehmel Oct. 18, 1949.          R. C. DEHMEL          2,485,435
AIRCRAFT NAVIGATING AND TRAINING APPARATUS
Filed Aug. 14, 1945                    6 Sheets-Sheet 4

INVENTOR
Richard Carl Dehmel

Oct. 18, 1949.  R. C. DEHMEL  2,485,435
AIRCRAFT NAVIGATING AND TRAINING APPARATUS
Filed Aug. 14, 1943  6 Sheets-Sheet 5
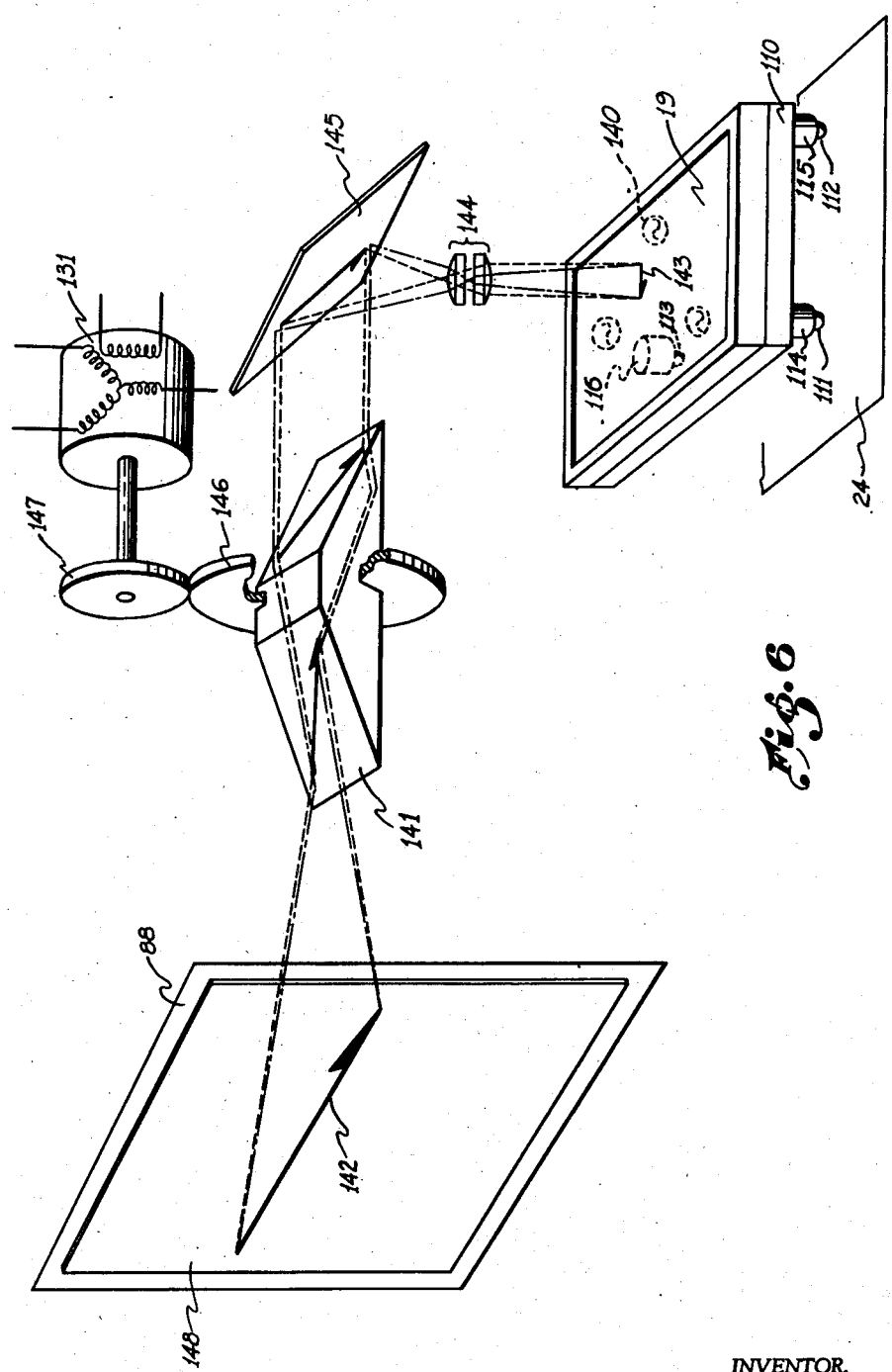
INVENTOR.
Richard C. Dehmel Oct. 18, 1949.　　　　R. C. DEHMEL　　　2,485,435
AIRCRAFT NAVIGATING AND TRAINING APPARATUS
Filed Aug. 14, 1943　　　　　　　　　6 Sheets—Sheet 6

INVENTOR.
RICHARD CARL DEHMEL.
BY
his ATTORNEY.

Patented Oct. 18, 1949

2,485,435

UNITED STATES PATENT OFFICE 2,485,435

AIRCRAFT NAVIGATING AND TRAINING APPARATUS

Richard Carl Dehmel, Summit, N. J.

Application August 14, 1943, Serial No. 498,906

8 Claims. (Cl. 35—10)

My invention relates to apparatus for use in operational aircraft and in grounded aircraft training devices and more particularly to an optical projection feature whereby an image of the terrain or a target, with respect to which a flight is being conducted, may be projected into view of the operating personnel of the aircraft or training device to assist them in solving problems of piloting, navigating, bombing, gunnery, or in the making of various kinds of aerial measurements, observations, or surveys. My invention also is useful for amusement purposes.

In my Patent No. 2,366,603 dated January 2, 1945, for "Aircraft training apparatus," I have disclosed a trainer and improvements thereto in which blind flying by instruments and radio guides may be practiced on the ground. In this previous trainer, a student may simulate flight over any desired area, and the course of the flight is plotted by a course charting device.

According to my present invention, an optical system is combined, for example, with apparatus such as disclosed in my said patent whereby civil and military pilots and crew members of operational aircraft may be given extensive and intensive practice in the many aerial operations requiring visual reference to objects with respect to which their aircraft is flying. This practice may be given without the loss of time, the expense or the exposure to the hazards involved in training in actual flight equipment.

It is therefore an object of the present invention to provide facilities for use with grounded flight training apparatus by which a real or virtual image of an object, with respect to which the aircraft is moving, may be projected into view of a trainee, the image accurately varying in scale factor, speed, and direction of motion in accordance with the manipulation of the controls of the trainer by the trainee.

It is another object of the present invention to provide facilities utilizing the movement of a course indicating or charting device and the direction indicating apparatus of a grounded flight trainer to project a moving image from a still photograph into view of a trainee, the appearance and movement of the image being controlled by the movement of the flight controls of the trainer.

It is a further object of my invention to make the illusion of flight in grounded training apparatus more real by providing a prismatic projection system operated in combination with the steering mechanism and course indicating or charting device of the training apparatus to produce before a trainee an image of the ground or other aerial object with respect to which flight is being simulated and to cause this image to move in accordance with the flight path described by the trainer as it is maneuvered.

With respect to each of these and following objects, it has been my purpose to render the projection feature entirely automatic in operation so that its value as an aid to the student is wholly independent of the skill of any instructor or attendant in manipulating controls.

It is a feature of my present invention that a trainee may use grounded training apparatus for practicing complicated maneuvers, such as flight with wind drift around a square field at constant altitude, and to thereby be independent of weather conditions, the existence of a wind in the proper direction, and the hazards and expense of actual flying.

My invention, in addition to being useful in connection with a trainer, is also useful in connection with an actual aircraft used for training or used for operational flights. According to this application, another feature of the invention resides in the operation of an optical system from the flight instruments of an actual aircraft whereby a moving image is projected from a still photograph of the flight region into view of the aircraft crew. According to this feature a navigator or a bombardier may sight on the projected image during periods when the target is obscured as by intermittent overcasts, and to navigate or bomb directly from measurements made by tracking on the projected image.

These and many other features of the invention, such as a novel means for introducing the effects of wind drift and superimposing the motion of a target over another object or the terrain will be more clearly understood by reference to the following text and the drawing in which practical commercial embodiments of the invention are shown. It is to be clear, of course, that such illustrations are primarily for purposes of disclosure and that the structures may be modified in various respects without departure from the broad spirit and scope of the invention hereinafter defined and claimed.

Parts in the specification and drawing will be identified by specific names for convenience, but these are intended to be as generic in their application to similar parts as the art will permit.

Like reference characters denote like parts in the several figures of the drawings of which:

Fig. 2 is an elevation view of the embodiment of Fig. 1 and shows further details of the apparatus for projecting into the view of a trainee an image of a terrain map or aerial object, with respect to which a simulated flight is being conducted;

Fig. 6 is an elevation view of an alternative projection apparatus.

Fig. 7 is a side elevational view showing a modified form of gear and rack drive for the embodiment shown in Fig. 3.

Figure 1:
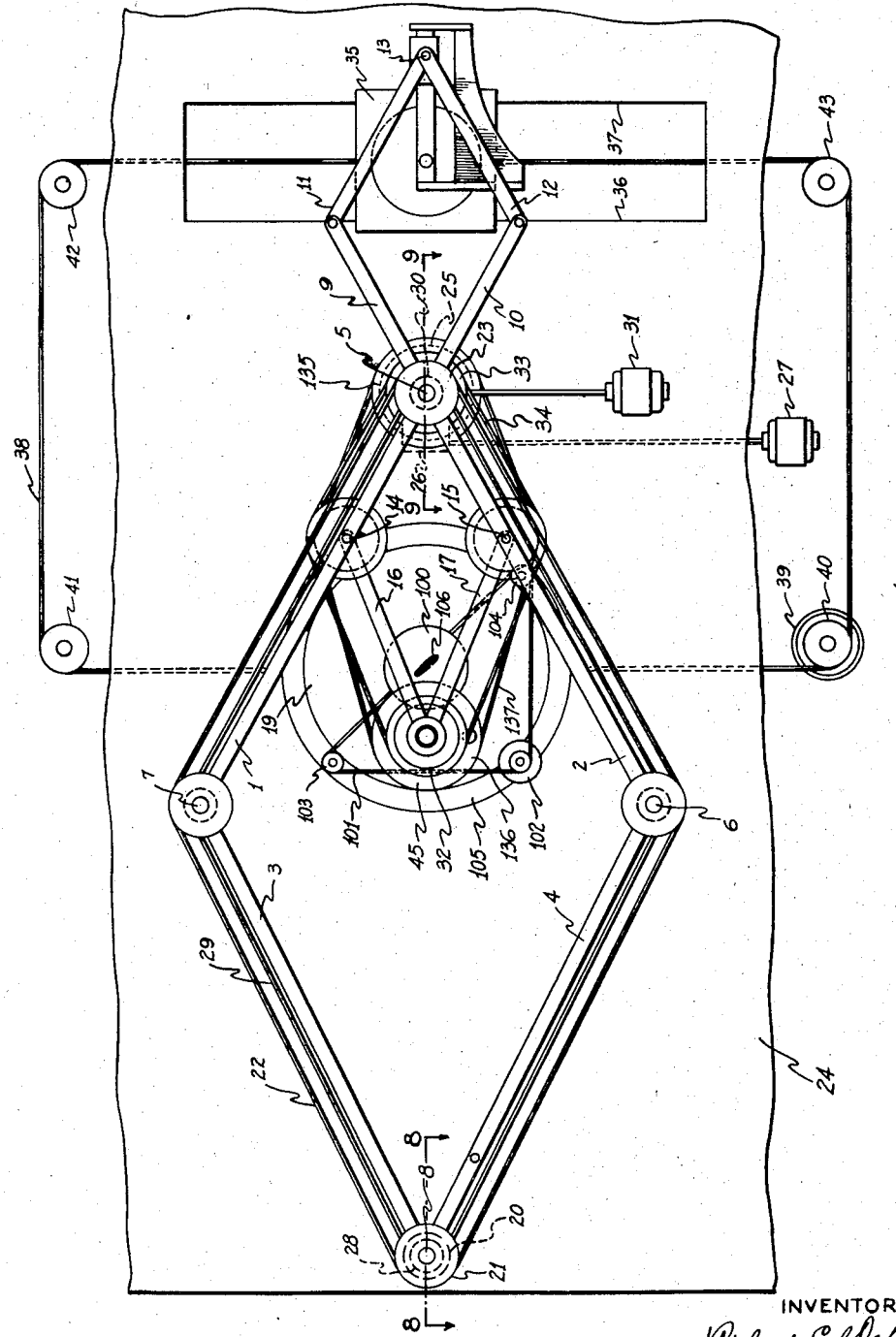
Fig. 1 is a plan view of one embodiment of the invention showing the course charting device of an aircraft trainer operatively connected to the projection means.

The application of the invention is not to be limited to any particular type of trainer, as it can be adapted for use with electrically, fluid or mechanically operated training systems and with a variety of flight recording devices. For convenience, one form of the invention will be described wherein it is adapted to a trainer of the type disclosed in my said patent. This trainer is illustrated in Fig. 1 as having a course indicating or charting apparatus of the pantograph type. The main pantograph comprises four arms, 1, 2, 3 and 4 pivoted together at their junctions by pivots 5, 6, 7 and 8. The arms 1 and 2 have short extensions 9 and 10 to the ends of which pantograph arms 11 and 12 are pivoted, the latter arms being pivoted together at their junction by a pin 13. Also pivoted to the arms 1 and 2 by pivots 14 and 15 are two additional pantograph arms 16 and 17 at the junction point of which is a projection unit 45, more fully disclosed in Fig. 2, for projecting an image of a terrain map or object with respect to which a simulated or actual flight is being conducted, into the view of a trainee who may be a bombardier student who is being instructed in bombing technique or who may be any other of the trainer crew such as the pilot or navigator or an operator of an actual aircraft on an operational flight.

Figure 8:
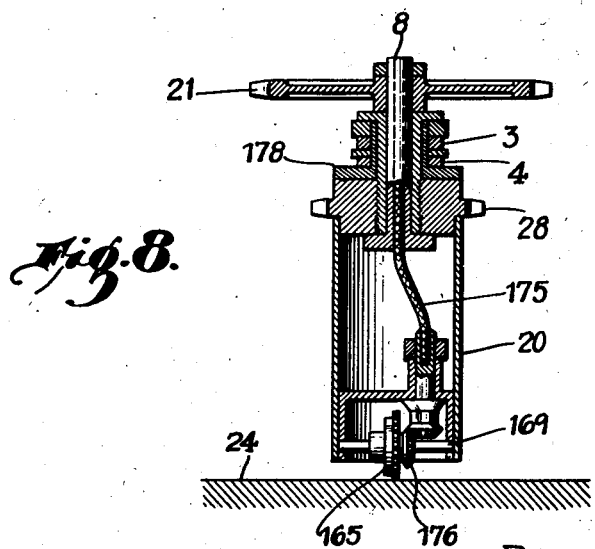
Fig. 8 is a sectional view in elevation taken at line 8—8 of Fig. 1.

At the junction point 8 (Fig. 1) is located a driving head 20 which is movable with the pantograph and journaled for rotation about the axis of shaft 8 (Fig. 8). The position of the head 20 on the table 24 represents the location of the aircraft, orientation of the head about the axis 8 represents the true course and the velocity of the head is proportional to the air speed of the aircraft whose flight is being simulated. The head 20 has a tractive wheel 165 (Fig. 8) mounted for rotation about its own axis 169 and driven through mitre gears 176, a flexible shaft 175, the shaft 8 and a sprocket 21 which is attached to the shaft 8, so that rotation of the sprocket 21 rotates the wheel 165, causing the head 20 to traverse the table 24 to simulate air speed of an aircraft. The head 20 has fixed thereto the sprocket 28 which is secured with a journal sleeve freely rotatably supported in a bearing 178 passing through the pantograph arms 3 and 4: so that rotation of the sprocket 28 rotates the head 20 and determines the direction of travel to simulate turning of the aircraft. The sprockets 21 and 28 of the head 20 are driven in the manner described following:

An air speed motor 27 (Figs. 1 and 9) is mounted on the under side of the table 24 and is in driving engagement through reduction gearing 170 and worm gear 26 with a worm wheel 25 which is attached to the lower end of the shaft 5, journaled in a pedestal support 164 secured to the table 24, and the shaft 5 carries fixed to its upper end the sprocket 23 in driving engagement with a chain 22 which passes around the gear 21 of the head 20 to thereby drive the tractive wheel 165. The pedestal 164 also carries journaled therein a sleeve, on the upper end of which is freely journaled a sprocket 30 which is driven by a steering motor 31 (Fig. 1) through a suitable mitre gear drive designated as 180. The sprocket 30 is in driving engagement with a chain 29 which passes around the gear 28 of head 20 to thereby rotate the head about the axis 8. To guide the chain 29, idler pulleys shown in dotted lines are rotatably mounted on the pivots 6 and 7 of the pantograph. A second sprocket wheel 33 concentric and attached to sprocket 30 drives chain 34 which engages with the sprocket wheel 32 of the projection unit 45. Thus through the operation of the air speed motor 27, the driving head 20 is advanced over the surface of the table 24 at a speed proportional to the indicated air speed and is oriented to determine the direction of its movement under the control of the steering motor 31 and, because of the pantograph construction, the projection unit 45 is moved proportionately over the picture 19. Also since sprocket 30 and the driving chain 29, which orients the driving head 20, also drives sprocket 33 and chain 34 which engages the sprocket wheel 32, the projection unit 45 is oriented in the same degree as the driving head. The air speed motor 27 and the steering motor 31 are responsive to the aircraft controls by a suitable means such as those shown in my said patent.

The pivot pin 13 also moves through a path which corresponds to and is parallel to the flight course traced by the projection unit 45, and may operate a suitable signal controller designated 35 for varying radio signals. A suitable unit for this purpose being fully described and shown in my said Patent No. 2,366,603.

The cord 38 driven by motor 39 moves the controller 35 in its guides 36 and 37 to introduce the effects of wind drift on the radio signals. Pulley 40 is attached to the armature of motor 39 and drives the cord 38 around idlers 41, 42 and 43 supported from table 24. The projector 45 scans a picture 19 which may be an aerial photograph produced by any suitable black and white or color process. The emulsion for the photograph is preferably applied to a transparent sheet which may be glass. The photograph is illuminated by a lamp 87, Fig. 2. The picture 19 may equally well be a map, a view of another aircraft or any other object or objective. If desired the picture may be opaque and be illuminated by reflected light. The cord 38 is operatively connected to and moves the picture 19 at a rate and direction corresponding to the wind drift of the aircraft, as will be hereinafter more fully described.

Superimposed on picture 19 may be a second picture 100 moved with respect to the picture 19 by the cord 101 driven by the motor 102 at any desired velocity to represent the movement of the article represented by the second picture 100. The cord 101 passes around the idler pulleys 103 and 104 mounted on the frame 105 which is rotatable to any azimuth with respect to the picture 19. Accordingly, the second picture 100 may be moved with respect to picture 19 in any desired direction. The second picture 100 may, for example, be a plate of glass or other transparent material on which is depicted a target such as a ship shown at 106 or a train, tank or other aircraft which is moving with respect to the first surface represented by the picture 19. The frame 105 may be suitably mounted for said rotational movement on a base or plate which in turn is mounted, as in parallel guide-ways, carried on the table 24, for movement in the direction parallel to the direction of movement in which the cord 38 moves the picture 19. Therefore, merely by fastening the picture 19 to the base or plate on which the frame 105 is rotatably mounted, the frame 105 and the map 19 may be conjointly displaced by the cord 38 when the object 106 simulates a target moving in contact with the earth's surface and the aircraft or trainer is being drifted by wind simultaneously with respect to both. On the other hand if the target 106 is to represent another aircraft with respect to which the trainer is being flown, then the track plate or base on which the frame 105 is carried may be freed from said linear movement and only the picture 19 need be moved by cord 38.

The projection unit 45 shown more in detail in Fig. 2 comprises a cylindrical casing 46 having an internal flange 47 on its lower edge and an axially disposed upwardly extending cylindrical portion 48. The lower end of the casing is closed by a plate 49 having an axially disposed and downwardly extending cylindrical portion 50. The plate 49 may be secured to the flange 47 of the casing 46 by suitable screws, such as 51. Casing 46 is supported on the pantograph arm 17 by a collar 52 which surrounds the cylindrical portion 48 of the casing and is secured thereto by screws such as 53. The end of the pantograph arm 17 is provided with an annular portion which is seated on the collar 52 and secured thereto by screws, such as 54. The end of pantograph arm 16 is also provided with an annular portion 55 which rotatably embraces the cylindrical portion 48 of the casing. The annular portions of the arms 16 and 17 are separated by a spacing ring 56 of any suitable material. The casing 46 of the projection unit 45 is thus supported at the junction point of the pantograph arms 16 and 17 and the portion 48 of the casing serves as a pivot at the junction of the ends of such arms.

Rotatably mounted in the downwardly extending cylindrical portion 50 of the end plate 49 of the casing 46 is a lens tube 57. To the upper end of this lens tube and within the casing 46 a bevel gear 58, having a spur-gear 59 attached thereto or formed integrally therewith, is secured by the screw 60. Secured to the lens tube just beneath the lower end of the portion 50 of the plate 49, as by a screw 61, is a collar 62. The gear 58 and collar 62 thus serve to prevent axial movement of the lens tube within the cylindrical portion 50 of the plate 49. Positioned within the lower end of the lens tube is an objective lens 63 and positioned in the upper end of the tube is a prism 64. The lens tube 57 is rotatable with respect to the casing 46 by the sprocket wheel 32. For this purpose the sprocket wheel 32 is rotatably mounted on the cylindrical portion 48 of the casing 46 between the collar 52 and a shoulder 65 of the casing; and the sprocket 32 has secured thereto or integrally formed therewith the spur-gear 66. The spur-gear 66 drives the spur-gear 59 through the pinion gears 67 and 68 secured to the shaft 69. The shaft 69 is journaled in bearings in the upper end of the casing 46 and in the lower flange portion 47 of the casing and is held against axial movement by the collar 72 secured to the shaft. The spur-gears 59 and 66 are of the same pitch diameter as are the pinion gears 68 and 67 and therefore the lens tube 57 is rotated to the same degree and in the same direction as the sprocket wheel 32, and therefore, since the sprocket wheel 32 is driven by the chain 34 which moves conjointly with chain 29 which orients the driving head 20, the lens tube 57 is given the same azimuthal orientation as the driving head.

Rotatably mounted within the upper cylindrical portion 48 of the casing 46 is a second tube 73 having a bevel gear 74 secured to the lower end thereof within the casing 46 as by screw 75 and having a retaining collar 76 secured to the upper end thereof as by a screw 77. The tube while free to rotate with respect to the casing is thus held against axial movement. The gear 74 has the same pitch diameter as the gear 58 and such gears are interconnected by the bevel gears 78 and 79 and the spur-gears 80 and 81. Gear 78 meshes with the bevel gear 74 and is integrally formed with spur-gear 80, such gear assembly being mounted for rotation on a stud shaft 82 secured to the side wall of casing 46. Gear 79 meshes with the bevel gear 58 and is integrally formed with spur-gear 81. Such gear assembly is mounted for rotation on a stud shaft 83 secured to the side wall of casing 46. Gear 80 meshes with gear 81 and has twice the pitch diameter of gear 81 and therefore the rotation of gear 58 and the lens tube 57 to which it is secured causes the rotation of gear 74 at one-half the speed of gear 58 and in the same direction of rotation whereby the tube 73 is rotated in the same direction as the lens tube 57 but at half the speed thereof. The tube 73 is provided with a prism 84.

The prisms 64 and 84 are of the well-known dove reflecting type and have the property of rotating an image at twice the rate at which the prism itself is turned. (Reference: Elementary Optics, prepared under direction of Chief of Ordnance, U. S. Government Printing Office 1065. See Fig. 115.) Reflecting mirrors arranged to deviate the light beam through the same angle as the dove prisms may be used instead of either or both of the prisms 64 and 84.

Figure 9:
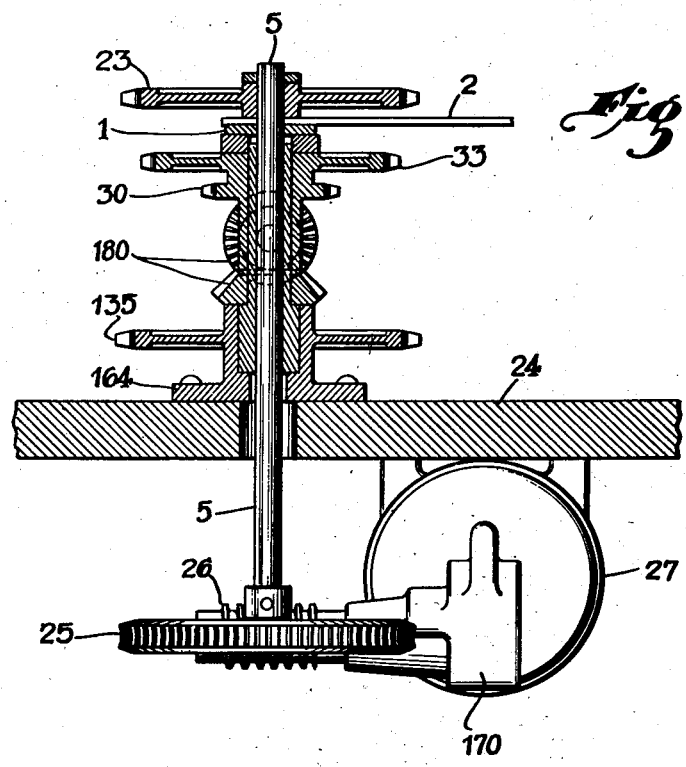
Fig. 9 is a sectional view in elevation taken at line 9—9 of Fig. 1.

To maintain the casing 46 of the projector in constant alignment with respect to a reference axis, such as the north direction on the table 24, a sprocket 135, Figs. 1 and 9, is secured to the table 24 and another sprocket 136, Figs. 1 and 2, is secured to the casing 46 of projector 45. These sprockets are held in fixed relationship by the chain 137 which passes around the idle sprockets (shown in dotted position) and mounted on the respective axes 14 and 15.

The projection unit 45 as disclosed in Figs. 1 and 2 is movable over the picture 19 which may be placed on a transparent plate 86 located over an opening in the table 24. The picture may be brightly illuminated by a spotlight 87 located beneath the plate 86. Positioned above the projection unit 46 and in the alignment with the picture 19 is a translucent screen 88. Preferably the screen should be located over an opening in the floor 89 of the cockpit of the trainer adjacent to the trainee's seat. If the trainee be a student bombardier the screen 88 may be in a position corresponding to the opening through which he would normally sight his bombsight. A bombsight 90 is disclosed as mounted on a suitable supporting stand 95 to enable the student bombardier to select any designated target area of the the image of the picture 19 projected upon the screen 88 by the projection unit 45 for simulated bombing. The apparatus 90, instead of being a bombsight, may be a wind drift measuring instrument as employed by navigators.

As the projection unit 45 is moved over the picture 19, the objective lens 63 scans different areas of the pictures 19 and 100 and projects an image of the scanned areas upon the screen 88. If a portion of the scanned area of one or both of the pictures 19 and 100 be indicated by the arrow 91, then since the lens tube 57 and the prism 64 carried thereby, are rotated by the sprocket wheel 32 and the gears 66, 67, 68 and 59, the prism 64 rotates the image 91 at twice the angular rotation of the driving head 20 which responds to the steering control of the trainer. For example, if the prism 64 is rotated 90° the object 91 appears to be rotated 180° as shown at 92. To reduce the rate of turning of the image to unity, with respect to the driving head 20, the prism 84 is driven as previously described at one-half the rate but in the same direction as the prism 64 so that an image of the scanned area 91 appears, in the present example, to be rotated 90°, as at 93. This image is then projected upon the screen 88 in enlarged size where it may appear as indicated by the arrow 94.

It is noted that in this embodiment the optical system is such that the image 94 of the portion 91 of the picture 19 is not reversed, relative to the picture. Therefore in this embodiment the projection unit moves to the left (Figs. 1 and 2) or in the direction opposite to that of the flight, and the image 94 moves in the same direction as the unit 46, or toward the observer in a direction opposite to that of the flight; thus creating a sensory illusion of forward movement of the observer relative to the object, such as the ground.

The screen 88 as previously stated may be located in the floor of the cabin of the trainer and, if it be assumed that the trainer is not movable, the screen has no rotation in azimuth to correspond to any steering control exercised by the student pilot. However, due to the arrangement of prisms 64 and 84 and their associated orienting and scanning means, the image 94 as viewed on the screen 88 will traverse and rotate in exactly the same manner in front of the bombardier or other trainee as the earth would appear to move when looking down on it while flying a duplicate straight or varying course in an actual aircraft. This precise and true movement of the image on the screen permits a student pilot, navigator or bombardier to view the image with his instrument 90 in the same manner that he would view the ground and thereby enables him to receive important and valuable training without the hazard and expense of actual flight. Moreover, if the pictures 19 and 100 are moved by the cord 38 at a rate and direction equivalent to any desired wind drift as described for the signal controller in my said Patent No. 2,366,603, the trainee may view the image projected at 94 with his bombsight 90 or a wind drift indicator and thereby practice in bombing or navigation under wind conditions.

By observing the image 94 of the terrain map over which the simulated flight is being conducted, by observing the wind drift with a wind drift instrument in connection with the projected image, and from the observation of the other instruments of the trainer which give information necessary for accurate bombing, as for example the air speed and the altitude at which the simulated flight is being conducted, the student bombardier may set his bombsight 90 with respect to the projected image 94 for bombing a target area of the projected image specified by the instructor.

Figure 3:
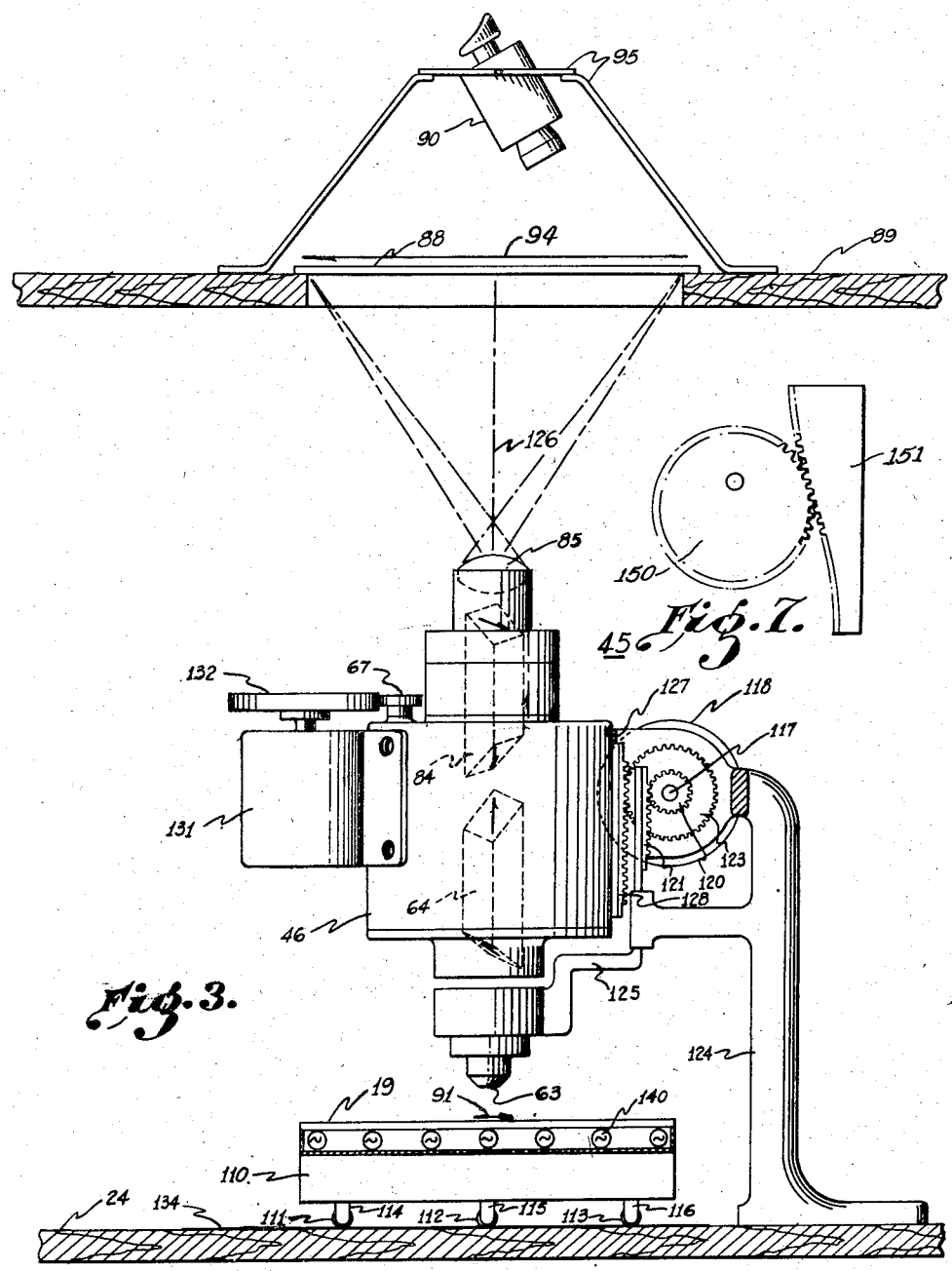
Fig. 3 is an elevation view illustrating a modified form of certain features of the invention, including altitude responsive adjustment of the projecting means.

An alternative form of image projecting device is shown in Fig. 3. In this form the optical axis 126 of the projector 45 is stationary with respect to the table 24 and also with respect to the screen 88 whereas the picture 19 moves in accordance with the pilot's manipulation of the aircraft controls, the picture being carried on a moving course charting device or crab platform 110. This crab may be of the well-known type described in the Link U. S. Patent No. 2,179,663. In this device the tractive wheels 111, 112 and 113 are driven at a velocity corresponding to the speed of the aircraft and the direction of its motion is controlled by synchronously rotating the supports 114, 115 and 116 in accordance with the direction of flight of the aircraft. In this embodiment (Fig. 3) the optical system is such that there is a reversal in the position of the image 94 with respect to the portion 91 of the picture 19. Therefore, the platform 110 moves to the right or in the direction of flight so that the image 94 is caused to move to the left or toward the observer in a direction opposite to that of the flight; thus creating a sensory illusion of forward movement of the observer relative to the object, such as the ground. The velocity and direction control for the crab may be derived from the airspeed and steering motors, 27 and 31, respectively, Fig. 1, or they may be derived from a trainer such as the Link trainer of U. S. Patent No. 2,099,857 as described in U. S. Patent No. 2,179,663.

The picture 19, Fig. 3, is illuminated by the lamps 140. The projector of Fig. 3 is provided with a projection lens 85 in addition to the objective lens 63 for the purpose of providing a focusing means as is fully described hereinafter.

Figure 4:
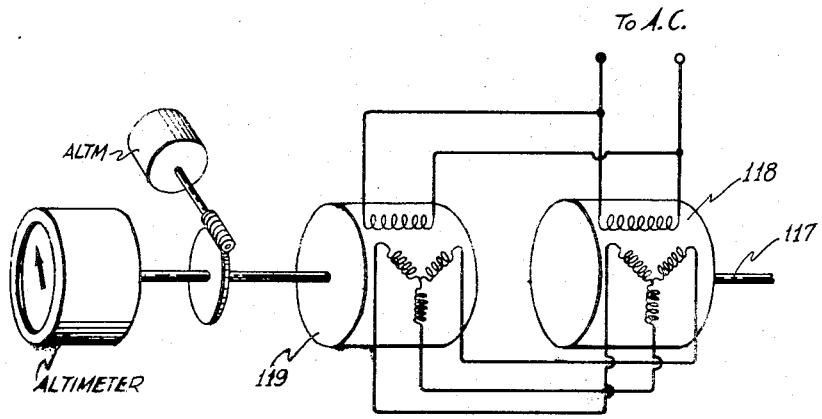
Fig. 4 is a circuit schematic for an electric drive for the altitude adjustment of the apparatus of Fig. 3.

It is a feature of the apparatus shown in Fig. 3 that the objective lens 63 and the projection lens 85 are movable along their axis 126 with respect to the picture 19 and the screen 88. This movement of these lenses is controlled by shaft 117 which is rotated in accordance with changes in altitude of the trainer. Shaft 117 (Fig. 3) may be connected by a suitable mechanical drive to the altimeter motor ALTM of the trainer described in my said Patent No. 2,366,603 or the shaft may be operated by an electrical synchronous repeater system such as shown in Fig. 4, which will now be described. An electrical motor ALTM is suitably controlled for operation in either direction and at variable speeds in accordance with change in altitude of the simulated flight, and the motor ALTM is here shown in driving engagement with a simulated altimeter. The receiving synchronous electrical unit 118 (Figs. 3 and 4) is connected to shaft 117 and a transmitting unit 119 is driven from the shaft of the altimeter as shown in Fig. 4, the two elements being electrically interconnected in the usual manner to cause the armature of the receiver 118 to follow any rotation of the armature of the transmitter 119.

As the altitude of the flight changes, shaft 117 drives gear 120 which operates rack 121 to move arm 125 and to thereby proportionately change the distance of lens 63, carried by arm 125, from picture 19.

Axial movement of lens 63 away from picture 19 causes a larger portion of the area of said picture to be cast on screen 88 and in this manner the image of any object is changed in size with altitude and appears just as it would when viewed from an actual aircraft. However, with movement of lens 63 it becomes necessary to refocus the projection lens 85 to obtain a clear, sharp image on screen 88. Accordingly, the housing 46, which carries the objective lens 85 is adjustably attached to support 124 by a tongue and groove slide 127 and its position may be changed with respect to lens 63 and screen 88 until a sharp image is formed. It is a feature of my invention that this refocusing is done automatically. This is accomplished by attaching to shaft 117 a gear 123 which engages a rack 128 attached to casing 46. The ratio between the pitch diameters of gears 120 and 123 is so chosen that the movement of lens 85 is always in the correct proportion to the movement of lens 63 to produce a clear image on screen 88. Where extremely large changes in altitude are to be made it will be necessary to vary the distance between lens 63 and picture 19 between wide limits in order to properly vary the magnification and thereby the scale factor of the image. To retain the correct movement between lenses 63 and 85, and the picture 19 and screen 88 under such wide range conditions, it may be necessary, in order to maintain a sharp focus of the image on the screen 88, to replace the constant pitch diameter gears 120 and 123 with suitable mechanism for changing the uniform motion of the driving shaft 117 to a non-uniform movement of the lenses 63 and 85, to thereby maintain a sharp focus. Such a mechanism may take the form of varying pitch diameter gears in driving engagement with racks of suitable contour to engage these gears as said gears rotate. For example each of the pairs of gears and racks 120—121 and 123—128 may take the form shown in Fig. 7 where there is illustrated somewhat diagrammatically a driving gear 150 having a varying pitch diameter in mesh with the cooperating driven gear rack 151, having a contour such as to maintain driving engagement during rotation of the gear. In such an arrangement uniform angular rotation of the driving gear 150 will produce a non-uniform motion of the driven rack 151 and the lens connected thereto.

Instead of moving the lens 85 to refocus the image in the projection plane 88 when the distance of lens 63 is changed with respect to the picture 19, it would be entirely satisfactory to omit lens 85 and refocus the system by varying the distance of plane 88 from lens 63.

Figure 5:
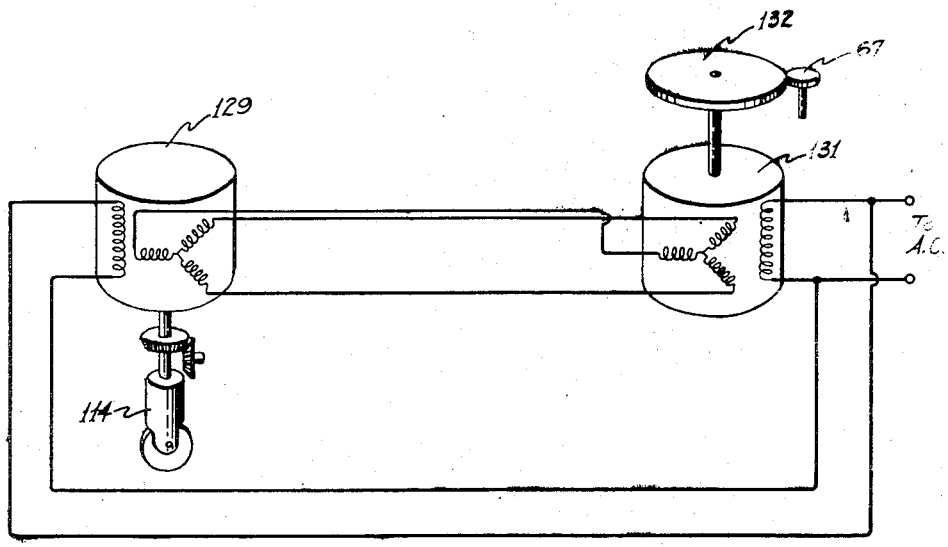
Fig. 5 is a circuit schematic for an electric drive for the rotary optics of Figs. 3 and 6.

If the pivotal supports (Fig. 3) 114, 115 and 116 of the recorder 110 are oriented by the motor 31 as previously described, the prisms 64 and 84 of the projector, Fig. 3, may be rotated by a suitable mechanical connection of proper gear ratio between motor 31, Fig. 1, and gear 67, Fig. 3. A very convenient alternative means for orienting the prisms 64 and 84 with respect to the heading of the aircraft comprises the use of a synchronous repeating system as shown in Fig. 5 wherein the synchronous transmitter 129, is driven from one of the pivotal supports of crab 110, for example support 114 as shown in Fig. 5. A synchronous repeater 131, Figs. 3 and 5, is electrically connected to the transmitter 129, Fig. 5, and drives gear 132, Fig. 1, which engages with gear 67.

Gears 132 and 67 have the same pitch diameter ratios as gears 59 and 68, respectively, Fig. 2. Gear 132 thereby drives gear 59 in synchronism with the supports 114, 115 and 116 of crab 110.

In the foregoing description I have disclosed means for producing in a trainer a moving image on a screen from a "still" photograph, the movement of the image relative to the observer and size of the image being exactly the same as that of a like object viewed from an actual aircraft maneuvered in the same manner as the trainer. The term "still" photograph as herein employed is intended to mean any single frame picture and is to differentiate the apparatus from a motion picture projector as used in cinematography.

It is to be noted that the picture 19 may be an aerial photograph of an enemy objective and that copies of this photograph may be placed in several separate trainers of the type referred to, each trainer being equipped with the projection apparatus of this invention and with an intercommunicating telephone circuit. The several trainers may then be flown by their operators in simulation of a squadron flying over the enemy objective, instructions being given over the intercommunicating system.

The apparatus of my invention is not to be restricted in scope to use with pictures representing objects in a horizontal plane. The apparatus is equally applicable to the projection of moving images from "still" photographs to simulate the viewing of objects in a vertical plane as from the side windows of an aircraft. For this purpose the picture 19, Fig. 1, may be an aerial view taken in a vertical plane. The motor 27, as before, drives the head 20 at a velocity corresponding to the instant airspeed of the flight whereas the motor 31 is adapted to rotate the sprockets 30 and 33 according to changes in direction of the flight from horizontal, namely, to angles representing the pitch of the aircraft. According to this arrangement the image projected on the screen 88 will appear as if moving past a side window of an actual aircraft. If the picture 19 is that of another aircraft, the sight 90, Fig. 2, may be mounted in a vertical plane and be used to simulate a gun sight for practicing gunnery between aircraft.

It is important to note that it is not necessary to use a screen such as 88 and form an image thereon from projector 45. By well-known lens systems a real, or a virtual image may be formed in space above the projection lens 85 as at the plane 88. In this specification and the following claims the term "projection plane" is intended to means the location in space where a real image is formed, and/or, the screen whereon an image is cast or the plane wherein an eyepiece may be placed to view a virtual image. The projection plane may be viewed directly by an operator or by an instrument such as 90 which may be a gun sight, a bomb sight, a drift gage, a sextant, or any other device used for viewing objects from aircraft.

It is also not necessary that the image formed by the projector be visible to the trainee. In many instances it may be preferable to place the screen 88 where it may be viewed by an instructor and obscured from the trainee; so that the trainee will not be permitted to receive a visual illusion of the flight, while permitting the instructor to do so. For example, if the student is being instructed in blind flying, the instructor may wish to observe the result of the student's actions as the flight progresses while having the student depend on the instruments, rather than on his vision.

An alternative form of projection apparatus is shown in Fig. 6 wherein a single "Dove" type prism 141 is used to rotate the image 142 of the object 143. As in Fig. 3, the apparatus 110 may be a Link crab or any other suitable form of aircraft position indicating element adapted to move a picture 19 of an object with respect to which a flight is being made, the motion of the picture being in the direction of the flight; so as to move the image in the opposite direction and thus create a sensory illusion of flight.

It is to be noted that the picture 19 does not itself rotate but is fixed in azimuth. This is due to the construction of the crab which employs pivoted supports 114, 115 and 116 which all rotate together and with respect to the frame of the crab 110.

The picture 19 is illuminated by the lamps 140.

Lens 144 is an objective lens for scanning the picture 19 of which a selected part is the object depicted by arrow 143. A mirror 145 is used to produce a reverted image at the entrance face of prism 141. Any other form of reflecting element such as a prism may be used as an alternative for the mirror. The "Dove" prism 141 is rotated at one-half the angular rate of the change in flight heading of the aircraft. Referring to Fig. 6, prism 141 is secured to gear 146 which meshes with gear 147, the latter having one-half the pitch diameter of gear 146. Gear 147 is rotated in accordance with the direction of flight of the aircraft. For this purpose a mechanical connection may be arranged between gear 147, Fig. 6, and azimuth gear 33 associated with the compass of the trainer, or, alternatively, gear 147 may be oriented electrically by a remote control teletorque system or the synchronous drive shown in Fig. 5 and hereinafter described in detail. In this synchronous drive the unit 131 is a synchronous repeater and bears a like reference character in Fig. 6. A real image 142 may be formed in the projection plane 88 or it may be formed on a screen 148 mounted at the projection plane. If desired an eyepiece lens system may be so placed as to view the rays of the image 142 and form a virtual image of any convenient magnification.

A novel application of the present invention is in the testing of bomb sights. For this purpose a bomb sight may be mounted in apparatus similar to the training apparatus described in my copending applications above referred to, and a real image may be formed by projector 45 in the plane contained by screen 88, or, a virtual image may be formed on said screen and viewed by the sight all in the manner fully hereinbefore described. The trainer may be operated at known altitudes, airspeeds, wind drifts, directions, pitch and banks for which the release points for any given bomb may be calculated by well-known equations. The bomb sight being tested will develop release point information from position and rate data derived by tracking the projected image on screen 88. A comparison may be made of the calculated and developed data to determine the accuracy of the sight.

Since, in one above described form of my invention, the projection apparatus operates according to airspeed, heading and altitude, it can be adapted not only to any form of trainer in which these parameters are developed by the trainer mechanism, but also to actual aircraft as an aid to navigation and bombing. By well-known torque amplifying means the indications of the airspeed and compass of an actual aircraft can be utilized to respectively propel the tractive wheels 111, 112 and 113, and to rotate the supports 114, 115 and 116 of these wheels, so that the crab 110 will move over a table 24 in the aircraft in exactly the path which the aircraft is flying over the ground; it being noted that the direction of movement of the crab 110 will be such as to cause the image to move toward the observer, as heretofore described. If a map or picture of the terrain over which a flight is being made is placed on crab 110 the projector 45 will show the exact position of the aircraft on screen 88 at all times. Accordingly, while flying above intermittent overcasts, the pilot or navigator may constantly note his position over the terrain whether or not he can see the ground.

In the foregoing embodiment an additional teletorque amplifying unit may be provided for operating shaft 117, Fig. 3, from the altimeter of the aircraft, and the compass teletorque drive may be adapted to rotate gear 67 at the proper speed ratio from the compass of said aircraft. The image formed on screen 88 will then vary in size, speed, and direction in accurate relation with the maneuvers of the aircraft and the image will have the same appearance that the actual object would have if viewed from the aircraft. This precise movement and change in scale factor of the image permits its use as a tracking aid in bombing. A bombardier may track his target on the image instead of observing the actual terrain and obtain comparable bomb release prediction data. He may accordingly engage enemy objectives which are obscured by intermittent overcasts, using moments when the ground can be seen to check the accuracy of the position of the crab 110, and by tracking the image projected from the crab can develop bomb release data even though the target itself cannot be seen.

What I claim is:

1. In an aviation device and the like adapted to simulate a flight with respect to an object, means operable by a flyer for controlling the flight, a still representation of the object adapted to be projected in a projection plane, a projection system optically interposed between the representation and the plane for producing an image of the representation in the plane, rotatable optics disposed in the optical path of the system whereby the image of the representation may be rotated in the projection plane to represent azimuthal changes in the flight, means operatively connected to said flight controlling means for adjusting the rotary optics with changes in the direction of the simulated flight, a course indicator operatively connected to the device and operable to move in accordance with the flight path and means operated by said course indicator for producing relative motion between the representation and the projection system.

2. In emplaced apparatus adapted to simulate the flight of an aircraft with respect to an object, means operable by a flyer for controlling said flight, a still photograph of the object adapted to be projected in a projection plane, an adjustable lens system comprising an objective scanning element and a projection element optically interposed between the picture and the plane for producing an image of the picture in the plane, means responsive to the flight-controlling means for adjusting the relative distances between said scanning and projection elements and between each of said elements and the picture and said plane, respectively, in accordance with the instant altitude of the flight to thereby vary the scale factor of the image in proportion to said altitude and to maintain the image constantly in focus in the plane, rotatable optics disposed in the path of the lens system whereby the image of the picture may be rotated in the projection plane, means responsive to the flight-controlling means for rotating the optics with changes in the direction of the simulated flight, and driving means under control of the simulating apparatus for producing relative translation between the lens system and the picture in the instant direction of the flight for translating the image in the projection plane in proportion to the speed of the simulated flight, the combination of said altitude variation of scale factor, the said rotation of the image and said translation of the image in the plane, together giving said image the same appearance to an observer thereof, as the object would have if viewed by the observer from an actual aircraft in similar flight.

3. In an aviation apparatus, means under the control of a flyer for operating the apparatus in simulation of flight with respect to an object, a directional element moving in accordance with the instant flight heading of the apparatus, a speed element moving in accordance with the instant airspeed of the apparatus, a flight path indicating device conjointly responsive to the directional and speed elements for indicating the course of the flight, a still representation of the object adapted to be projected in a projection plane, a projection system optically interposed between the representation and the plane for producing an image of the representation in the plane, rotatable optical means disposed in the optical path of the projection system whereby the image of the representation may be rotated in the projection plane, an operative connection between the directional element and the rotatable optical means for continuously orienting the optical means in accordance with changes in the flight heading, means operatively connected to the course indicating device for producing relative motion between the representation and the projection system proportional to the speed of the flight, and means for maintaining the representation in fixed azimuthal orientation.

4. In apparatus adapted to simulate the flight of an aircraft and the like, means operable by a flyer for controlling said flight with respect to two objects having relative motion with respect to each other, a first and a second still representation of the first and second objects adapted to be projected in a projection plane respectively, means for producing relative motion between said representations in accordance with the motion between said objects, a projection system optically interposed between the pictures and the plane for producing an image of each picture in the plane, rotatable optical means disposed in the optical path of the projection system whereby the images of the pictures may be rotated in the projection plane, first means under control of the flight simulating apparatus for rotating the optical means with changes in the direction of the simulated flight, and second means under control of the simulating apparatus for producing relative translation between the projection system and the pictures in the direction of flight whereby to superimpose a translation on the motion of the images in the projection plane, said superimposed translation being proportional to the speed of the simulated flight.

5. In grounded apparatus adapted to simulate the flight of an aircraft and the like with respect to an object, means operable by a flyer for controlling said flight, a still picture of the object, a projection plane, a projection system optically interposed between the picture and the plane for producing an image of the picture in the plane, rotatable optics comprising a first and a second Dove type reflecting prism each disposed and rotatable co-axially with respect to the other and disposed in the optical path of the system whereby the image of the picture may be rotated in the projection plane, power means responsive to the flight-controlling means for rotating said first prism synchronously with changes in the direction of the simulated flight and said second prism conjointly therewith and in the same direction as the first prism but at one-half the angular rate, and driving means responsive to the flight controlling means for producing relative translation between the projection system and the picture in the direction of flight whereby to translate the image in the projection plane at a speed proportional to the speed of the simulated flight, the resulting rotation and translation of the image in the projection plane giving said image the same appearance to an observer thereof, as the object would have if viewed from an actual aircraft in similar flight.

6. In apparatus adapted to simulate the flight of an aircraft and the like, means operable by a flyer for controlling said flight with respect to two objects having relative motion with respect each to the other, a first and a second still picture of said first and second objects respectively, means for producing relative motion between said pictures representing the motion between said objects, projecting means for producing an image of each of said pictures in a projection plane, and means under control of the simulated apparatus for producing relative translation between the projection means and the pictures in the direction of flight, to thereby superimpose a translation on the motion of the images in the projection plane, said superimposed translation being proportional to the speed of the simulated flight.

7. In an aviation apparatus, means under the control of a flyer for operating the apparatus in simulation of flight with respect to an object, a directional element moving in accordance with the instant flight heading of the apparatus, a speed element moving in accordance with the instant air speed of the apparatus, a flight path indicating device conjointly responsive to the directional and speed elements for indicating the course of the flight, a still representation of the object adapted to be projected in a projection plane, a projection system optically interposed between the representation and the plane for producing an image of the representation in the plane, rotatable optical means disposed in the optical path of the projection system whereby the image of the representation may be rotated in the projection plane, an operative connection between the directional element and the rotatable optical means for continuously orienting the optical means in accordance with changes in the flight heading, means operatively connected to the course indicating device for producing relative motion between the representation and the projection system proportional to the speed of the flight, a source of signals adapted to represent radio signals, a receiver therefor, and means responsive to said course indicating device for varying the said signals in accordance with the movement of said course indicating device to thereby automatically vary said signals in synchronism with the movement of said image.

8. In emplaced apparatus adapted to simulate the flight of an aircraft with respect to an object, means operable by a flyer for controlling said flight, a still representation of the object adapted to be projected in a projection plane, an adjustable lens system comprising an objective scanning element and a projection element optically interposed between the representation and the plane for producing an image of the representation in the plane, means responsive to the flight-controlling means for adjusting the relative distances between said scanning and projection elements and between each of said elements and the representation and said plane, respectively, in accordance with the instant altitude of the flight to thereby vary the scale factor of the image in proportion to said altitude and to maintain the image constantly in focus in the plane, rotatable optics disposed in the path of the lens system whereby the image of the representation may be rotated in the projection plane, means responsive to the flight-controlling means for rotating the optics with changes in the direction of the simulated flight, and driving means under control of the simulating apparatus for producing relative translation between the lens system and the representation in the instant direction of the flight for translating the image in the projection plane in proportion to the speed of the simulated flight, the combination of said altitude variation of scale factor, the said rotation of the image and said translation of the image in the plane, together giving said image the same appearance to an observer thereof, as the object would have if viewed by the observer from an actual aircraft in similar flight at the simulated altitude.

RICHARD CARL DEHMEL.

REFERENCES CITED

The following references are of record in the file of this patent:

UNITED STATES PATENTS

| Number | Name | Date |
|---|---|---|
| 1,631,866 | Heurung | June 7, 1927 |
| 1,745,933 | Kauch | Feb. 4, 1930 |
| 1,842,067 | Brewdouw | Jan. 19, 1932 |
| 1,935,070 | Walther | Nov. 14, 1933 |
| 1,987,625 | Karnes | Jan. 15, 1935 |
| 2,085,050 | Stout | June 29, 1937 |
| 2,119,083 | Link | May 31, 1938 |
| 2,161,536 | Sordoillet | June 6, 1939 |
| 2,267,649 | Graves | Dec. 23, 1941 |
| 2,271,296 | Hargrave | Jan. 27, 1942 |
| 2,313,480 | Reid | Mar. 9, 1943 |
| 2,314,497 | Hargrave | Mar. 23, 1943 |
| 2,326,764 | Crane | Aug. 17, 1943 |
| 2,329,612 | Hill | Sept. 14, 1943 |
| 2,336,436 | Beindorf | Dec. 7, 1943 |
| 2,352,101 | Hutter | June 20, 1944 |
| 2,385,095 | McCarthy | Sept. 18, 1945 |
| 2,385,291 | Link | Sept. 18, 1945 |

FOREIGN PATENTS

| Number | Country | Date |
|---|---|---|
| 747,274 | France | 1933 |